Dec. 7, 1926. Re. 16,501
W. H. MILLSPAUGH
PAPER MACHINE DRIER
Original Filed Dec. 7, 1922 2 Sheets-Sheet 1
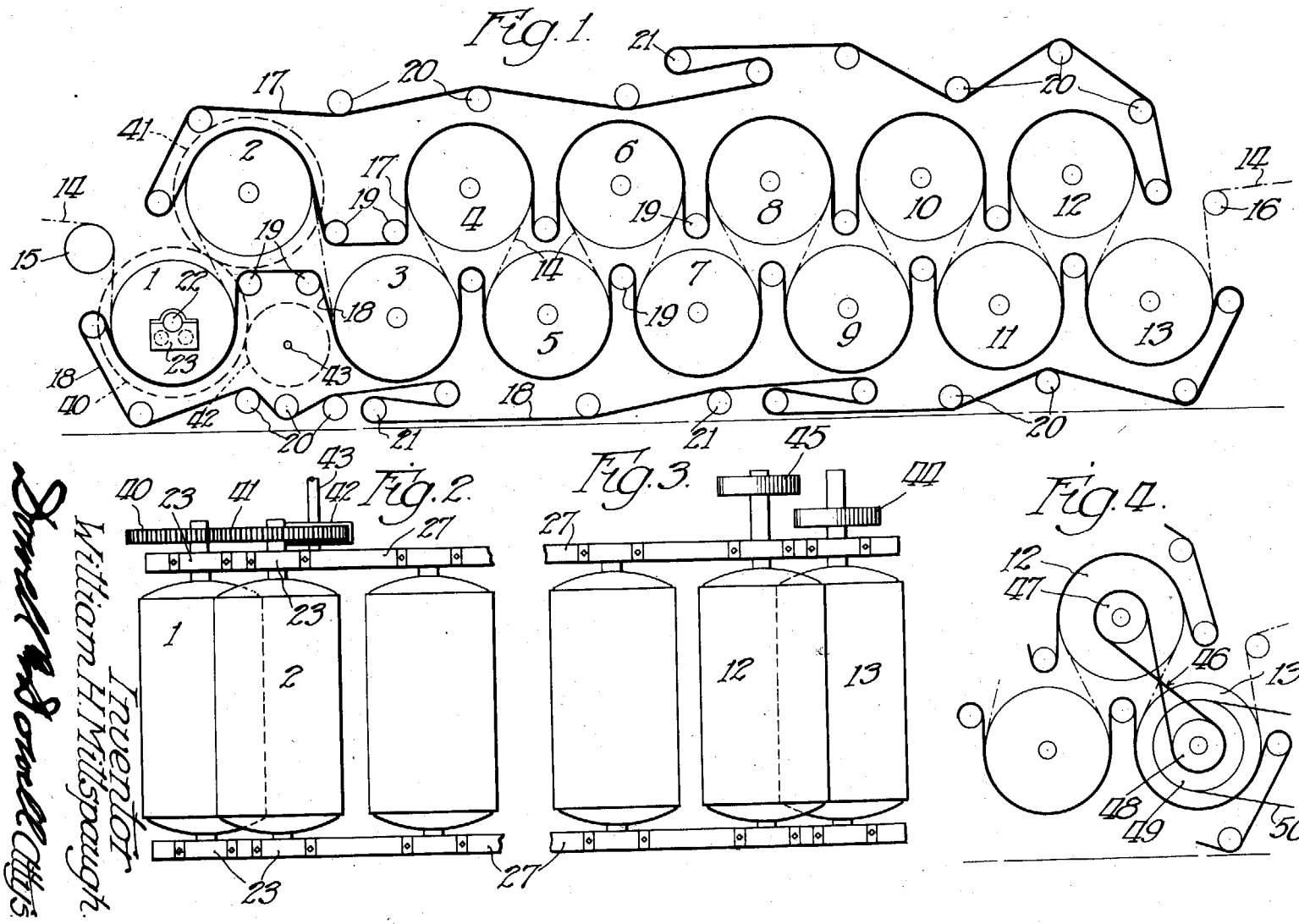
Inventor
William H. Millspaugh.
Dowell & Dowell Attys.

Dec. 7, 1926.
Re. 16,501
W. H. MILLSPAUGH
PAPER MACHINE DRIER
Original Filed Dec. 7, 1922 2 Sheets-Sheet 2
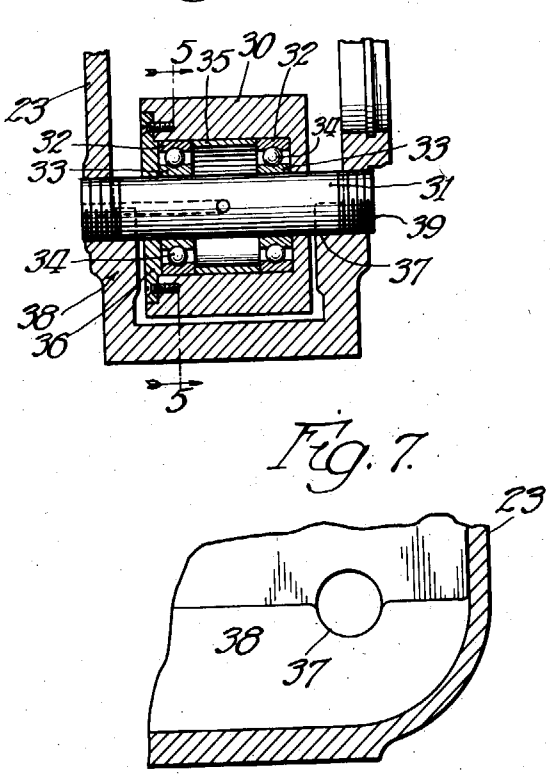
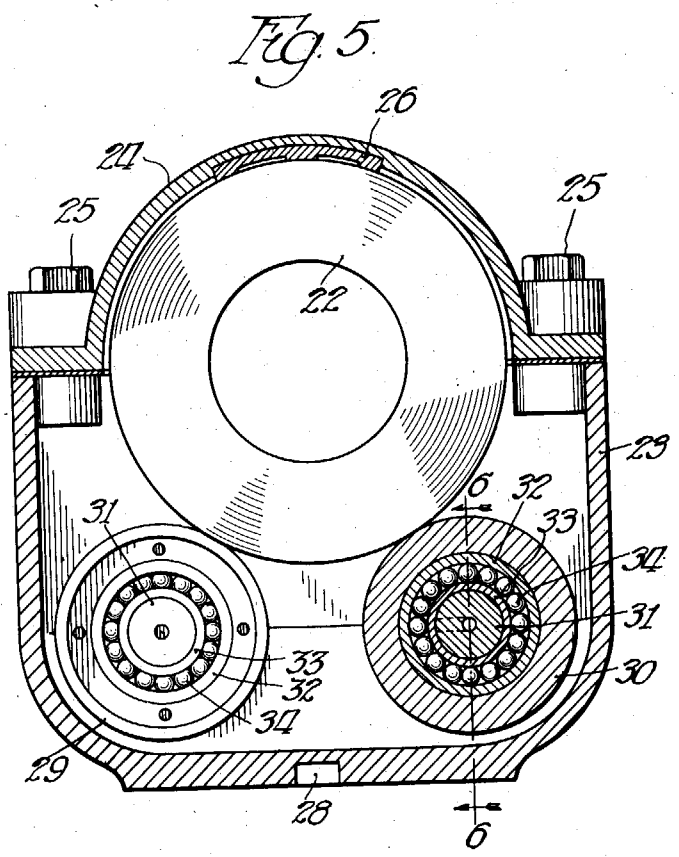
Inventor:
William H. Millspaugh
Dowell & Dowell Attys.

Reissued Dec. 7, 1926.

Re. 16,501

UNITED STATES PATENT OFFICE.

WILLIAM H. MILLSPAUGH, OF SANDUSKY, OHIO, ASSIGNOR TO THE PAPER AND TEXTILE MACHINERY CO., OF SANDUSKY, OHIO, A CORPORATION OF OHIO.

PAPER-MACHINE DRIER.

Original No. 1,533,130, dated April 14, 1925, Serial No. 605,379, filed December 7, 1922. Application for reissue filed May 17, 1926. Serial No. 109,813.

This invention relates to drying equipment for paper machines of the type comprising a succession of rotating heated drums or cylinders in contact with which the paper sheet is carried.

According to conventional practice, these drying cylinders have been driven by a train of intermeshing gears, each cylinder being equipped with a gear driven from a gear on another cylinder.

The present invention is intended to dispense with this elaborate and expensive gear drive. Accordingly, the drying cylinders are journalled on anti-friction roller bearings of a type which enables the cylinders to be rotated easily under application of comparatively light power, and the cylinders are driven by endless means entrained on or contacting with the cylinders; for example the felts which carry the sheet of paper in contact with the drying cylinders may be utilized as belts for driving the cylinders. It is therefore only necessary to provide a power applying means for driving the felts or other endless means contacting with the cylinders; which power-applying means may be conveniently applied to the first, last or any desired cylinder engaged by such felt or endless means.

In the annexed drawings:

Fig. 1 is a diagrammatic side view of one illustrative form of drying apparatus embodying the present invention;

Fig. 2 is a plan view of the receiving end of said drying apparatus, illustrating one means of applying power to drive the felts which in turn drive the drying cylinders;

Fig. 3 is a plan view of the delivery end of a similar drying apparatus, but illustrating an alternative method of applying power, in this instance to the last cylinder of the series;

Fig. 4 is a side view of the delivery end of similar equipment, illustrating another means of power application;

Fig. 5 is a sectional view of a cylinder journal bearing;

Fig. 6 is a detail cross section of the anti-friction bearings for a journal supporting roller; and Fig. 7 is a detail view showing a shaft support for the journal supporting roller.

The illustrative apparatus is of a conventional type, comprising in this instance two tiers of drying cylinders 1, 2, etc., those of the upper tier rotating in one direction, and those of the lower tier rotating in the opposite direction, so that the paper sheet running through the driers may pass alternately in contact with the cylinders of the upper and lower tiers. For instance, in the particular arrangement illustrated, the paper sheet 14, entering the driers over the guide-roller 15, passes around the lower half of the first cylinder 1, then over and in contact with the upper half of the next cylinder 2, then under and around the lower half of the next cylinder 3, and so on; the dried sheet being delivered from the last cylinder of the series over the guide-roller 16. The drying cylinders are designated respectively by the numerals 1 to 13 inclusive. Viewing the illustrative apparatus in Fig. 1, the cylinders of the upper tier rotate in a clockwise direction and those of the lower tier in a counter-clockwise direction.

Endless felts 17 and 18 are shown trained in engagement with the respective tiers of drying cylinders to carry the paper sheet in contact with the cylinders in the manner stated; the upper felt 17 being trained over or in contact with the upper parts of the cylinders of the top tier or row, and the lower felt 18 being trained under or in contact with the lower parts of the cylinders of the bottom tier or row, in a well-known manner. Guide-rollers for holding the felts to the cylinders are indicated at 19. Each felt is provided with a suitable system of guiding and tensioning rollers 20, engaging the return run of the felt, including one or more adjustable take-up or tightening rollers 21.

In order to eliminate the usual equipment of intermeshing gears for driving the cylinders, which gears are omitted from the illustrative apparatus, it is necessary to mount the journals 22 of the drying cylinders on bearings of such anti-friction quality as to permit the cylinders to be readily rotated by frictional engagement with an endless contacting medium, such for instance as the felts 17 and 18 when starting up the machine, or by the paper sheet held in contact with the cylinders by the felts after the machine is in operation.

A type of bearing adapted for this purpose is illustrated in Figs. 5 to 7 of the drawings, showing a construction designed by the present inventor for the special duty of supporting cylinder journals, and which not only possesses extreme anti-friction qualities, but is otherwise very practicable and reliable for the object in view. The specific construction of bearing shown may be briefly described as follows:

The cylinder journal 22 enters a journal box 23, shown having its upper part constructed as a removable cap 24 secured to the body of the box by stud bolts 25. A filler 26 of Babbitt metal or the like may be provided in the cap to bear on the top of the journal. The journal box, which is mounted on the rail 27 of the machine frame, may be slightly rounded on its bottom and may be provided with a central hole 28 at its base to pivotally engage a stud on the supporting rail, in order that the box may be self-adjusting to align with the journal.

Within the journal box, the journal 22 bears on a pair of rollers, 29 and 30, which are mounted by means of anti-friction bearings on fixed shafts 31; the anti-friction bearings being enclosed within the rollers, as shown more clearly in Fig. 6. Said anti-friction bearings, two of which are shown in Fig. 6, comprise concentric race rings 32 and 33 of hardened steel, and interposed hardened steel balls or rollers 34. In the specific construction shown, the outer race rings of the two bearings are separated by a spacing sleeve 35; one of the annular ball bearing devices being fitted in the end of the bore in the journal supporting roller 30 and a removable cap 36 being secured by screws in a countersunk recess at the other end of said roller 30, whereby the parts are maintained correctly in desired relationship.

The shafts 31 may be supported in any suitable way in the journal box walls, for instance by resting in the semicircular sockets 37 (Fig. 7) of the ledges or thickened wall portions 38 of the journal box. Screw plugs 39 are shown filling aligned openings in the opposite journal box walls, said screw plugs also serving in this instance to bear tightly against the ends of the shafts 31 and thus to secure said shafts against rotation; though of course it will be understood that other means for this function may be employed. The shaft 31 may be longitudinally and transversely grooved for supplying oil or lubricant to the anti-friction bearings encased in the journal supporting rollers, one of the screw plugs 39 associated with each shaft being desirably bored to permit introduction of the stem of a lubricant filling device (not shown).

With this construction, the cylinder journal 22 bears on comparatively large rollers, which in turn are freely revoluble on annular series of rolling elements revolving about fixed shafts; so that the heavy drying cylinder thus supported may be turned with expenditure of very little power. Aside from this anti-friction property in the bearing, the bearing is particularly adapted for the purpose in view, because it is one which will not tend to bind the journals under expansion caused by heat changes, it being understood that the journals of drying cylinders are subject to such temperature changes by the introduction of the steam or other heating medium through the hollow journals into the cylinders. With the illustrative bearing, expansion of the journal will merely raise its center, without affecting the anti-friction capacity of the bearing; and furthermore the construction is such that the annular ball bearing devices are removed from contact with the heated journals.

It will furthermore be observed that by mounting the journal-supporting rollers on stationary shafts, with the ball bearing devices enclosed within the rollers, as shown for example in the illustrative construction, such short shafts may be employed as to reduce shaft flexing under the load to a minimum; and such flexing as may occur will be substantially immaterial, since it has no other effect than the mere bending of a stationary shaft and consequently no tendency to set up crystallization as would accompany the flexing of a rotating load-sustaining shaft.

The drying cylinders of the paper machine being thus journalled on self-aligning, non-binding, extremely anti-friction journal bearings, the cylinders notwithstanding their weight may readily be set in motion by frictional engagement of the drier felts 17 and 18, in starting the machine, and by engagement of the paper sheet with the cylinders under the firm hold of the felts after the machine is in operation.

It is accordingly only necessary to apply power to run the felts, which in this instance serve the function of driving belts. For this purpose the journals of the first two drying cylinders 1 and 2 are shown provided with intermeshing gears 40 and 41, the gear 40 on the journal of cylinder 1 being driven by a pinion or gear 42 on a shaft 43, as clearly appears from Fig. 2. It will be understood, however, that the power may be applied to the last cylinder of the series or to any cylinder in engagement with the felt to be driven. It will also be understood that drying equipment may be supplied comprising only one tier of drying cylinders or two, three or more tiers, and the power application means should accordingly be modified to suit the circumstances; for instance if there were three or more tiers of cylinders, the cylinders of such tiers adjacent the cylinder 2 of the illustrative machine would likewise be provided with gears for transmitting power to the felts supplied with the extra tiers.

Fig. 3 shows an alternative power applying means in which the journals at one end of the cylinders 12 and 13, being in this instance the last cylinders of the group, are in the form of extended shafts and equipped with pulleys 44 and 45 for driving these cylinders by belts.

Fig. 4 represents an arrangement in which the cylinder 12 is driven from the cylinder 13 by a crossed belt 46 engaging pulleys 47 and 48; the cylinder 13 being provided with a pulley 49 to which power is applied by the belt 50.

Among other advantages the present invention avoids a positive gear drive of the cylinders at a peripheral speed differing from the speed of the paper and felts, which of course more or less fluctuates in the transit through the machine due to changes in moisture conditions. This will be readily appreciated by those familiar with the art.

Obviously the present invention is not limited to the specific details of construction and arrangement shown and described, which may be variously modified to suit different requirements and conditions; nor is it essential that all the features of the invention be used conjointly since they may be advantageously used in various different combinations and subcombinations.

Having thus described my invention, what I claim is:

1. In a paper drying apparatus, a rotatable drying cylinder unprovided with a driving gear; and non-binding anti-friction bearings for the cylinder journals; whereby the cylinder may be easily rotated with light application of power by the passage of a contacting medium.

2. An apparatus of the class described comprising, in combination, a plurality of drying cylinders in contact with which a sheet of paper is successively passed; said cylinders being unprovided with driving gears; anti-friction journal bearings for said cylinders; the construction and arrangement being such as to permit said cylinders to be rotated by endless means in frictional contact with the cylinders.

3. A machine of the class described, comprising in combination, a plurality of drying cylinders; anti-friction cylinder journal bearings; endless means frictionally engaging a plurality of said cylinders; a cylinder engaged by said means being provided with power applying means, the remaining cylinders engaged by said endless means being driven by the said endless means.

4. An apparatus of the class described, comprising anti-frictionally supported and freely rotatable drying cylinders and endless driving means for a plurality of such cylinders, operating by friction, there being no other power applying means associated with such plurality of cylinders.

5. In a paper drying apparatus, a rotatable drying cylinder unprovided with a driving gear; non-binding cylinder bearings comprising comparatively large journal supporting rollers; and anti-friction bearings on which said rollers are mounted; whereby the cylinder may be easily rotated with light application of power by the passage of a contacting medium.

6. In a paper drying apparatus, a gearless anti-frictionally journalled drying cylinder driven by the passage of a medium in contact with the cylinder surface.

7. In a paper drying apparatus, an anti-frictionally journalled drying cylinder; means trained about the cylinder for carrying the paper sheet in contact therewith; said cylinder being free of connection with driving mechanism other than through said means.

8. An apparatus of the class described comprising, in combination, a power-driven drying cylinder and a plurality of ungeared anti-frictionally journalled cylinders driven from said first mentioned cylinder by a medium traveling in contact with said cylinders.

9. An apparatus of the class described comprising a set of drying cylinders entrained by the sheet passing through the apparatus, including a plurality of ungeared anti-frictionally journalled cylinders and a driving cylinder connected with power-applying means.

10. An apparatus of the class described comprising a set of anti-frictionally journalled drying cylinders, entrained by the sheet passing through said apparatus; and driving means directly connected with only certain of said cylinders, from which the remaining cylinders are indirectly driven in the running of the sheet through the apparatus.

11. An apparatus of the class described comprising, in combination, a pluraltiy of drying cylinders; endless driving means frictionally engaging said cylinders; and means for driving said endless means.

12. An apparatus of the class described comprising, in combination, a plurality of drying cylinders; endless means frictionally engaging said cylinders; driving means connected with one of said cylinders; and other said cylinders being driven therefrom through said endless means.

13. An apparatus of the class described comprising, in combination, a plurality of anti-frictionally journalled drying cylinders; sheet-carrying means driving said cylinders; and means for driving said sheet-carrying means.

14. An apparatus of the class described comprising, in combination, anti-frictionally journalled drying cylinders; sheet-carrying means cooperating therewith; means connected with and driving certain of said cylinders; said sheet-carrying means being driven thereby and serving as driving means for a plurality of said cylinders; said plurality of cylinders being free of driving or other connections except through said sheet-carrying means.

15. An apparatus of the class described comprising, in combination, a plurality of anti-frictionally journalled drying cylinders; an endless felt for carrying a sheet of paper successively in contact therewith; one of said plurality of cylinders provided with power-applying means for driving said cylinder; the other cylinders of said plurality being driven by said felt.

16. An apparatus of the class described comprising, in combination, drying cylinders arranged in tiers; each tier including a power-connected driving cylinder and a plurality of ungeared anti-frictionally journalled driven cylinders; and endless means frictionally engaging the cylinders of each tier, whereby said ungeared cylinders are driven from the driving cylinder of such tier.

17. An apparatus of the class described comprising a series of drying cylinders in contact with which the paper sheet is successively passed, including a power-connected driving cylinder and a plurality of ungeared anti-frictionally journalled cylinders driven from said driving cylinder without connections therewith other than through the means employed for passing the sheet in contact with the cylinders.

18. An apparatus of the class described comprising, in combination, power-applying means; and a plurality of anti-frictionally journalled drying cylinders driven from said power-applying means through the passage of a medium traveling in contact with said cylinders.

19. An apparatus of the class described comprising, in combination, a plurality of anti-frictionally journalled drying cylinders; endless means operating by friction for driving said cylinders; and means for operating said endless means.

20. The combination with drying cylinders of means for driving certain only of the same, and a traveling belt associated with said cylinders and driving those not connected with said driving mechanism.

21. The combination with the drying cylinders of drive shafting provided with gearing for driving certain only of said cylinders and a traveling belt traveling over and around said drying cylinders and driving those not connected with said power shafting.

22. The combination of drying cylinders and a traveling felt driving said cylinders.

23. In combination, a plurality of drier rolls, felt rolls positioned intermediate said drier rolls, an endless felt passing partly around each of said drier rolls and engaging said felt rolls, and means for driving said felt to thereby rotate the drier rolls.

24. A paper machine drier comprising drier rolls an associated drier felt, and driving means communicating the drive to drier rolls through said drier felt.

25. A paper machine drier having, in combination, a drier felt; felt driving means including at least one driving roll engaged by said felt; and a plurality of gearless drier rolls engaged by said drier felt and to which the drive is communicated by said drier felt.

26. A paper machine drier having, in combination, gearless drier rolls in tiers; drier felts associated with the respective tiers; interconnected means for driving the respective drier felts; the drive being communicated to said drier rolls by said drier felts.

27. A paper machine drier having, in combination, a plurality of drier rolls; cooperating means for carrying the sheet of paper in contact therewith; said plurality of drier rolls being free of connection with driving mechanism other than through said sheet carrying means; and means for driving said sheet carrying means, the drive being communicated to said drier rolls by said sheet carrying means.

28. A paper machine drier having in combination, driving means including a roll, endless means frictionally engaged by said roll, and a plurality of drier rolls driven by said endless means, said endless means operating frictionally to communicate the drive from said driving means to said drier rolls.

In testimony whereof, I have signed my name to this specification.

WILLIAM H. MILLSPAUGH.